United States Patent
Okamoto et al.

(10) Patent No.: US 6,408,224 B1
(45) Date of Patent: Jun. 18, 2002

(54) ROTARY ARTICULATED ROBOT AND METHOD OF CONTROL THEREOF

(75) Inventors: Osamu Okamoto; Teruomi Nakaya; Heihachiro Kamimura, all of Tokyo; Isao Yamaguchi, Tokorozawa, all of (JP)

(73) Assignee: National Aerospace Laboratory of Science Technology Agency, Tokyo (JP)

(*) Notice: Subject to any disclaimer, the term of this patent is extended or adjusted under 35 U.S.C. 154(b) by 0 days.

(21) Appl. No.: 09/708,667

(22) Filed: Nov. 9, 2000

(30) Foreign Application Priority Data

Nov. 10, 1999 (JP) .......................................... 11-319334

(51) Int. Cl.⁷ ............................................. G06F 19/00
(52) U.S. Cl. ................. 700/245; 700/247; 700/261; 74/490.03; 74/490.04; 74/490.05; 74/665 L; 901/121.78; 901/121.79; 29/721; 29/740; 29/743; 701/23
(58) Field of Search ................................ 700/245, 247, 700/261; 701/23; 74/490.03, 490.05, 665 L, 490.04; 901/21, 23, 25, 28, 15; 219/121.79, 121.78; 29/721, 740, 743; 414/5, 7

(56) References Cited

U.S. PATENT DOCUMENTS

| | | | | |
|---|---|---|---|---|
| 4,510,012 A | * | 4/1985 | Kawaida et al. | 156/415 |
| 4,706,515 A | * | 11/1987 | Yasukawa | 74/490.04 |
| 4,707,585 A | * | 11/1987 | Monteith et al. | 219/121.79 |
| 4,732,526 A | * | 3/1988 | Nakashima et al. | 414/730 |
| 4,754,663 A | * | 7/1988 | Yasukawa | 74/665 L |
| 4,987,795 A | * | 1/1991 | Nguyen | |
| 5,193,963 A | * | 3/1993 | McAffee et al. | 414/5 |
| 5,195,235 A | * | 3/1993 | Mifuji | 29/721 |
| 5,236,131 A | * | 8/1993 | Hayward | 239/745 |
| 5,341,722 A | * | 8/1994 | Tami et al. | 91/43 |
| 5,355,743 A | * | 10/1994 | Tesar | 74/490.03 |

OTHER PUBLICATIONS

Hirzinger et al., A mechatronics approach to teh design of light–weight arms an multifingered hands, 2000, IEEE (Internet), pp. 46–54.*

Twinspin, The Twinspin news, 2001, Internet See entire document.*

* cited by examiner

Primary Examiner—Jacques H. Louis-Jacques
Assistant Examiner—McDieunel Marc
(74) Attorney, Agent, or Firm—Armstrong, Westerman & Hattori, LLP

(57) ABSTRACT

In a rotary articulated robot having at least a plurality of offset rotary joints in which a drive arm and driven arm are driven in rotation about an offset rotary axis inclined with respect to the arm axis, a hollow rotary shaft that is driven in rotation by a motor is arranged rotatably, being inclined, at the leading end of the arm of either the drive arm or driven arm while a rotor member to which turning effort from the hollow shaft is transmitted is fixed at the base of the other arm, said hollow rotary shaft and said rotor member constituting a high reduction ratio transmission/torque increasing mechanism. The method of control is that the operation of the joints is determined by dividing the operating region of the end effector into a plurality of blocks, the operating conditions of each joint necessary for movement to a prescribed block are converted to database form for each block, the teaching of operating points in the prescribed block region is converted to database form and a track is generated to the block of the operating region on the basis of the block region data; and when a reference point of the block is reached, the in-block operating point data is fetched.

12 Claims, 7 Drawing Sheets

ROTARY ARTICULATED ROBOT AND METHOD OF CONTROL THEREOF

BACKGROUND OF THE INVENTION

1. Field of the Invention

The present invention relates to a rotary articulated robot and a method of controlling a rotary articulated robot and in particular relates to a rotary articulated robot having offset rotary joints and a method of control thereof.

2. Description of the Related Art

Rotary articulated robots have previously been proposed (for example PCT International Publication WO 88/03856) provided with offset rotary joints wherein the joints have axes of rotation inclined at a prescribed angle with respect to the link axis. These offset rotary joints have a construction in which the driven arm performs conical rotary movement with an offset(slant) angle, its vertex being the point of intersection of the arm axis and the offset rotary axis. By providing a plurality of these offset rotary joints, precise three-dimensional positional location of the end effector can be achieved over a wide range of movement, with a simple mechanism involving only rotary movement. Also there is the advantage that, since only axial rotation is involved, precise positional location control can be achieved easily and large torque can be transmitted. Also, by linking a large number of arms by offset rotary joints, the arm as a whole can be made to move in a snake-like manner; thus, the end effector can be moved with a complicated operational path, making it possible to achieve movement that was not possible with previous rotary articulated robots.

However, when a large number of arms are linked in order to implement the above function effectively, the weight of the arm itself becomes large, giving rise to problems such as that the payload of the end effector is reduced and it becomes difficult to perform high-load operations. An offset rotary joint is therefore sought whereby higher torque can be obtained with lighter weight and smaller size.

In conventional robot systems, known methods of teaching position and attitude information include the direct teaching method, the remote teaching method using a joystick etc, and off-line teaching using numerical value data input etc. These methods of teaching are methods in which points on the trajectory of the robot from its starting point to the target position are directly or indirectly successively taught. In order to move the robot along the designated path between the operating points that have been taught, control quantities for the motors arranged at each joint are calculated in order to generate a trajectory, and these control quantities are supplied as instruction values to the motors. Consequently, when a complicated track is generated by a rotary articulated robot, there are the problems that teaching is difficult and calculation for generating the track becomes complicated and extensive, resulting in increased load on the computer, and slowing down the response speed and as a result of making it impossible to achieve smooth movement.

In particular, in the case of a rotary articulated robot having offset rotary joints as described above, there are countless combinations of movement of the joints in order to move the end effector from its starting point to the target position and generation of a trajectory is complicated so with the conventional method of controlling a robot the response time was inevitably slow.

SUMMARY OF THE INVENTION

An object of the present invention is to provide a rotary articulated robot of high functionality in which stronger rotary torque can be transmitted by adopting drive motors of smaller size and in which high precision positional location can be achieved, wherein offset rotary joints of small size, light weight and higher torque are obtained, and, by a linking up these offset rotary joints in multiple stages, large payloads can be achieved and a wide range of movement, and with which complicated precise movements are possible.

Another object of the present invention is to provide a method of controlling a rotary articulated robot in which, even with a rotary articulated robot having an end effector that performs complicated movement as described above, a trajectory to the target position can be generated in a simple fashion without requiring complicated calculation processing on each occasion, making it possible to perform a task with a rapid speed of response and in a smooth fashion even though the movement involved is complicated.

In order to achieve the above objects, in a rotary articulated robot according to the present invention having at least a plurality of offset rotary joints wherein a drive arm and driven arm are driven in rotation about an offset rotary axis inclined with respect to the arm axis, a hollow rotary shaft that is driven in rotation by a motor is arranged rotatably, being inclined at a prescribed offset angle, at the leading end of either the drive arm or the driven arm, while a rotor member to which turning effort from the hollow shaft is transmitted is fixed at the base of the other arm, said hollow rotary shaft and said rotor member constituting a high reduction ratio transmission/torque increasing mechanism.

Suitably, a harmonic drive mechanism can be applied as the high reduction ratio transmission mechanism, but there is no restriction to this, and other planetary gearwheel reduction mechanisms or special tooth shape reduction mechanisms etc could be employed. Also, preferably, by arranging for the turning effort from the motor to the hollow rotary shaft to be transmitted by meshing of an externally toothed bevel gear fixed to the output shaft of the motor and an internally toothed bevel gear fixed to the base of the hollow rotary shaft, it is possible to arrange the rotary axis of the motor within the arm coincident with or parallel to the arm axis and the arm diameter can thus be made smaller. Also, as the transmission mechanism from the motor to the hollow rotary shaft, a belt transmission may be adopted, comprising a pulley fixed to the motor output shaft, a pulley fixed to the base of the hollow rotary shaft, and a timing belt arranged between this pulley and the aforesaid pulley.

By making the motor of integral-case form such that its case constitutes part of the arm and by using a motor fitted with a brake and in which the encoder and tachometer are integral therewith, mounting and assembly on to the main body of the arm are facilitated and maintenance is also facilitated. Also, the arm can be held in a prescribed position without requiring a special brake device. Furthermore, by making the shaft end on the opposite side to the output side of the motor shaft project and providing a manual rotary adjustment portion on the projection, angular adjustment during assembly can be performed manually, facilitating assembly.

In a method of controlling a rotary articulated robot according to the present invention whereby the second object is achieved, the operating region of the end effector is divided into a plurality of blocks, the operating conditions of each joint necessary for movement to a prescribed block are converted to database form as block region data for each block, the teaching of operating points in the prescribed block region is converted to database form as in-block operating point data, and the end effector is moved to a reference point of the selected block by driving the joints so as to satisfy these conditions. The operation of the joint is then determined by fetching the in-block operating point data when the reference point of the selected block is reached. Consequently, since the movement of the joints is linked to the movement of the end effector and no complicated calculations to determine the track need be performed, the amount of data processing can be considerably reduced, making it possible to speed this up.

Although, in the present invention, as described above, the block region data and also operating point data within the block regions are converted into database form and control is performed using these in combination, thereby making it possible to speed this up, it would be possible to convert only either one of these to database form. In order to move the end effector into a prescribed block region, at each joint, the block region data provided from the database and the current operating condition are compared, and the joints are independently operated in parallel by independently controlling the motors such that the block region data is satisfied. If the operating region extends over a broad region, a plurality of blocks may be combined.

Also, when the arm of the rotary articulated robot is made to perform a complicated winding movement, in order to lighten the load on the computer so that higher speed can be achieved, according to the present invention, the joint control means that are installed at each joint are respectively independently connected with the central controller that controls the movement of the robot as a whole, and a network such that direct exchange of data can be achieved is constituted between the joint control devices; thus the joints can be controlled in parallel and angle information of the joints can be directly sent to adjacent joints when complicated movements are performed.

DESCRIPTION OF THE PREFERRED EMBODIMENTS

Embodiments of the present invention are described in detail below with reference to the drawings.

Figure 1:
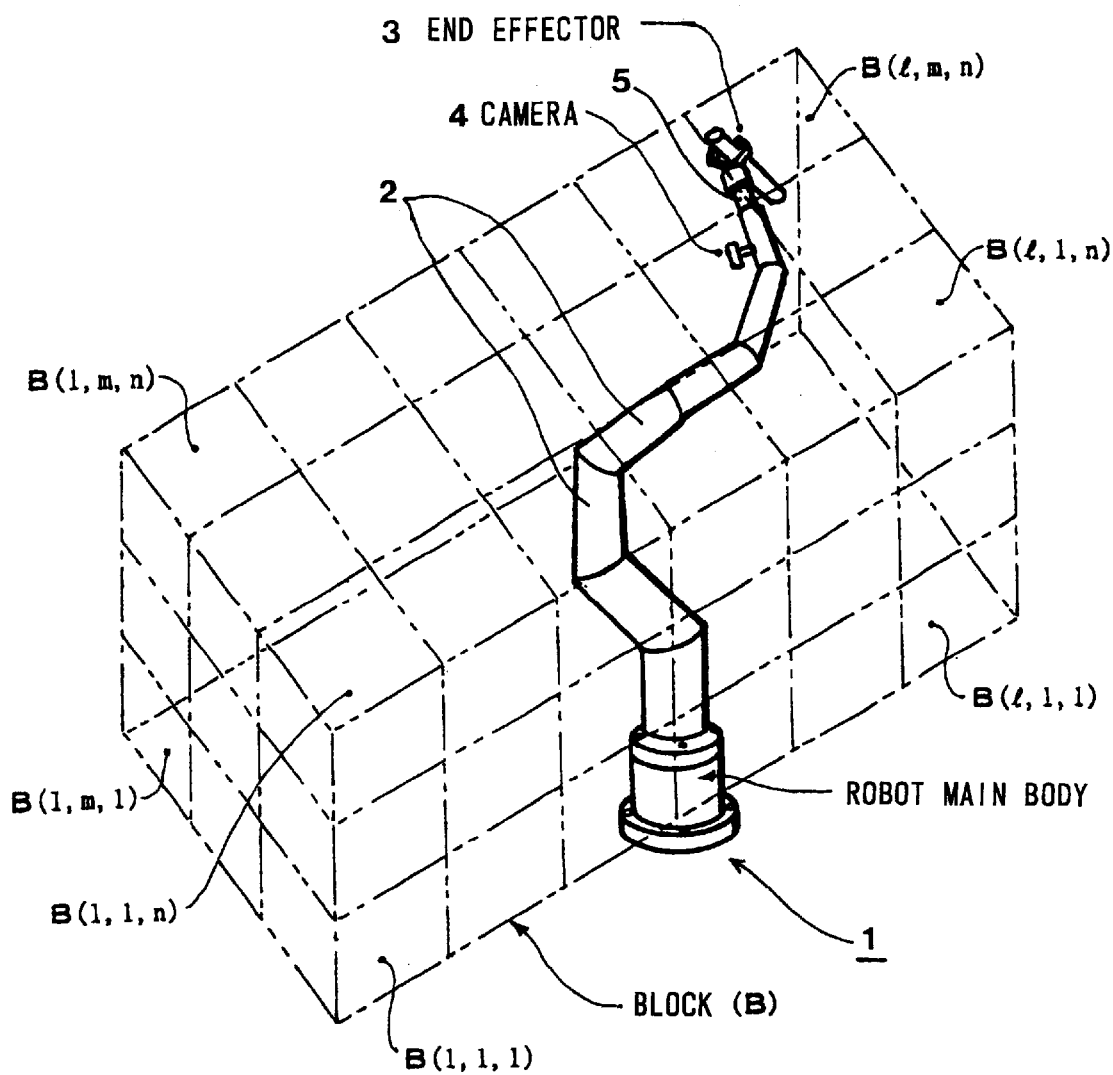
FIG. 1 is a perspective view illustrating the operating condition of a rotary articulated robot according to an embodiment of the present invention.

FIG. 1 is a diagram of a rotary articulated robot according to the present invention. In a rotary articulated robot 1 according to the present invention, a large number of arms 2 are linked by offset rotary joints, the robot arms themselves being capable of movement in the manner of a snake, so that an end effector 3 can move with six degrees of freedom in three-dimensional space and its direction can also be freely moved three-dimensionally. As shape identification sensors, the rotary articulated robot of this embodiment is suitably provided with joint cameras 4 and, if necessary, a base camera as well. The leading-end arm 5 that supports end effector 3 is formed so as to be capable of being freely extended or retracted and also rotated. Also, if required, rotary joints that do not have an offset angle and joints that are extensible in the axial direction can be suitably provided between arms that are linked by offset rotary joints.

An embodiment of an offset rotary joint for a rotary articulated robot according to the present invention is illustrated; its chief constructional characteristics are as follows:

(1) By adopting for the drive transmission mechanism of the joint a high reduction ratio/torque increase mechanism having a through-hole, precise reduced-ratio transmission with increased torque but without rattling was made possible.

(2) Furthermore, by adopting for the transmission of turning effort from the motor to the high reduction ratio/torque increase mechanism of the joint an externally toothed bevel gear internally toothed bevel gear mechanism or belt transmission mechanism, high reduction ratio and increased torque can be achieved and it becomes possible to arrange the motor coaxially within the arm, thereby enabling the arm diameter to be reduced.

(3) By integrating the motor with an encoder, slip ring and tachometer, and forming the motor case as part of the arm, a unitary construction is achieved in which the sensor means and control means of each joint are integrated with the motor; thus mounting in the arm is simplified and overall size was reduced. Furthermore, a through-hole was provided in the motor shaft.

(4) By providing a slip ring also on the output shaft of the joint, it was made possible to adopt a free rotation control system irrespective of the direction of rotation, thereby facilitating control of rotation.

(5) Assembly was facilitated by arranging for the motor shaft to project beyond the slip ring, so that, during assembly, the motor shaft can be rotated manually, thereby making it easy to adjust tooth meshing etc during assembly.

(6) It was arranged that the signal lines and/or power lines for transmission of control signals and power into the joints and to the end effector could be arranged passing through the interior of the arm and the rotary joints and such that these signal lines and/or power lines could not be damaged by the transmission mechanism of the rotary joints.

A specific construction of an offset rotary joint having the characteristics described above is described below with reference to FIG. 2.

Figure 2:
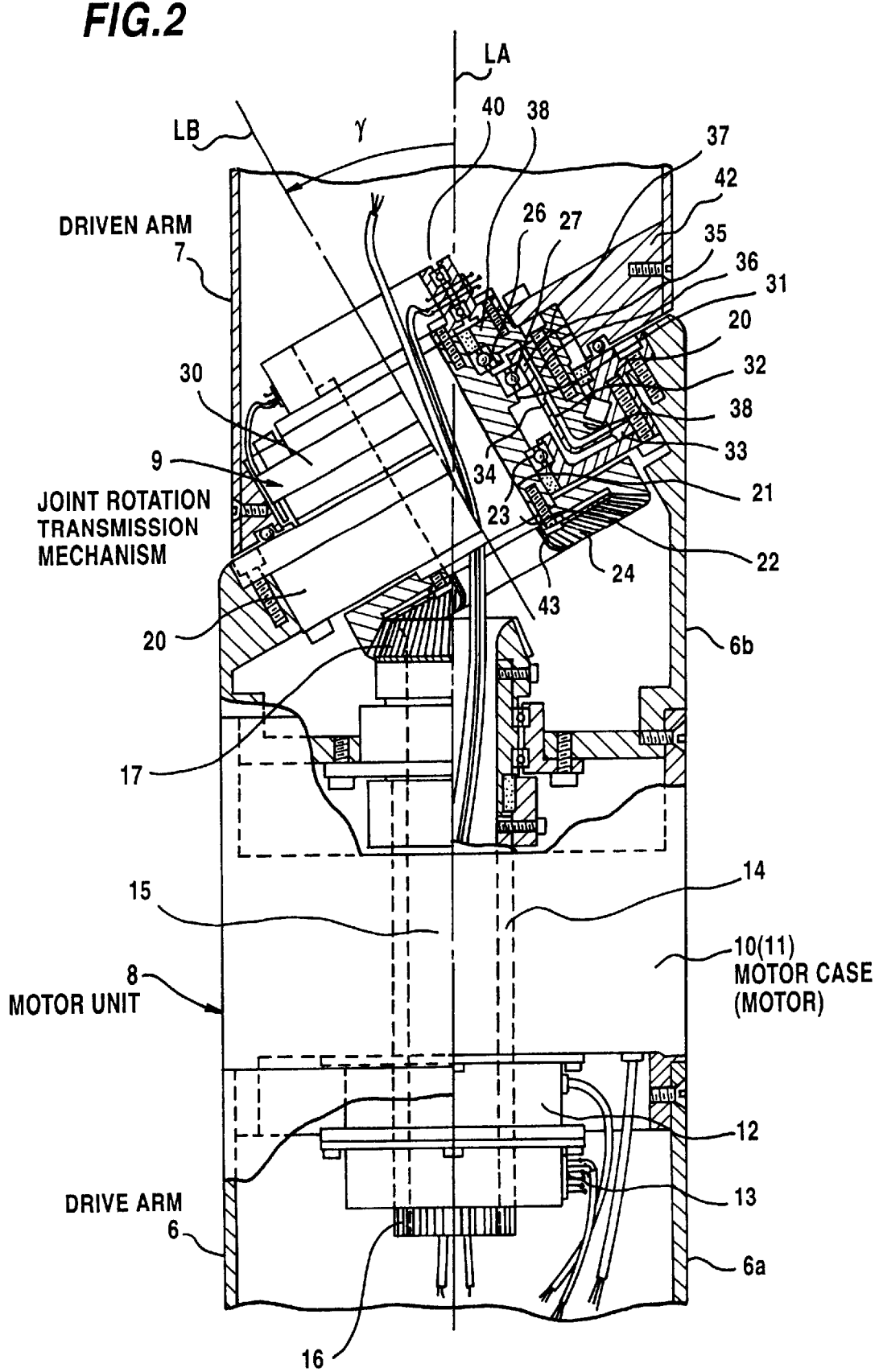
FIG. 2 is a partially broken away front view showing the region of an offset rotary joint of a multi-function robot according to an embodiment of the present invention.

The offset rotary joint shown in FIG. 2 is a case where a cylindrical nearside arm constitutes a drive arm 6 and a leading-end arm constitutes a driven arm 7, as shown in FIG. 1. The condition is shown in which the driven arm is linked by an offset rotary joint of offset angle γ with respect to the arm axis of the drive arm. The leading end of main arm body 6a of drive arm 6 constitutes an orthogonal aperture section orthogonal to the axis and the base end of the driven arm constitutes an inclined aperture section of angle of inclination γ with respect to the arm axis; the offset rotary joint assembly is arranged on the orthogonal aperture section and inclined aperture section.

The offset rotary joint assembly in this embodiment is constituted by integral assembly of a motor unit 8, a drive arm leading-end section 6b fixed at the leading end of this motor unit, and a joint rotation transmission mechanism 9 fixed to this drive arm leading-end section. The base end of drive arm leading-end section 6b is formed by the orthogonal aperture section, while its leading end is formed by the inclined aperture section. The leading end of the motor shaft is journaled in the orthogonal aperture section and the joint rotation transmission mechanism 9 is fixed to the inclined aperture section.

Motor unit 8 comprises a motor case 10 having the same diameter as the arm. The upper and lower ends of this motor case are integrated by being connected and fixed to the drive arm 6a and drive arm leading-end section 6b, as shown. Thus, the motor case 10 itself constitutes part of the drive arm. Motor unit 8 comprises a motor 11 integrally formed with motor case 10, an encoder 12, a slip ring 13, and a tachometer (not shown). Motor shaft 14 is arranged so as to be positioned coaxially with the arm axis or on a line parallel thereto.

For motor 11, there may be employed any small control motor capable of forwards and reverse rotation, such as a DC servo motor, AC servo motor, direct drive motor or pulse motor. Motor shaft 14 is formed in a hollow shaft having a through-hole 15, through the interior of which pass a signal line and power line. The base end section and leading-end section of the motor shaft 14 protrude from the motor case. An external bevel gear 17 formed with a through-hole communicating with the through-hole of motor shaft 14 is fixed to the leading-end section and is freely rotatably journaled in the base end of drive arm leading-end section 6b. Also, a rotary knob 16 is fixed to the base end of motor shaft 14, so that, on assembly, angle adjustment of the offset rotary joint can freely be performed manually.

Joint rotary transmission mechanism 9 comprises a stator constituting the drive side thereof and a rotor constituting the driven side thereof; the stator is connected to drive arm leading-end section 6b and the rotor is connected to the driven arm 7. Thus, as will be described in detail below, a harmonic drive mechanism is constituted by the stator and rotor such that turning effort is transmitted with a high reduction ratio from the drive side to the driven side.

Stator housing 20 is fixed to the drive arm leading-end section 6b, which constitutes the inclined aperture section; a cylindrical shaft 21 which is formed in the middle thereof with a through-hole 22 is freely rotatably journaled by means of bearing 23. The leading-end section of this cylindrical shaft 21 is also free rotatably journaled in rotor housing 30 by means of bearing 26. Consequently, this cylindrical shaft 21 is inclined by the offset angle γ with respect to the drive arm axis. An internally toothed bevel gear 24 that meshes with externally toothed bevel gear 17 mounted on the motor shaft is fixed at the base end of cylindrical shaft 21.

Also, a bearing flange 31 whose outer circumferential surface constitutes an elliptical cam is formed at the top of cylindrical shaft 21; bearing 27 is provided between this outer circumferential bearing surface and the inner circumferential surface of the top end of input gear member 32 that is fixed to stator housing 20. As shown in FIG. 2, the lower end of input gear member 32 is formed in cylindrical shape constituting a mounting flange 33, while the body portion 34 of the cylinder is formed of resiliently deformable metal material and the circumferential surface at its upper end is formed with external teeth 35.

Furthermore, on rotor housing 30, there is fixed an output gear member. 37 that is formed on its inner circumferential surface with internal teeth 36 that mesh with the external teeth 35. This output gear member is freely rotatably journaled on stator housing 20 by means of ring member 38 and a bearing, and its upper end is fixed to the driven arm through the rotor housing. The number of internal teeth 36 of output gear member 37 is formed larger (by for example two) than the number of teeth of the external teeth 35 of the input gear member 32, which deforms resiliently, thus constituting a harmonic drive mechanism whereby turning effort is transmitted with a large reduction ratio by cylindrical shaft 21, input gear member 32 and output gear member 7.

A slip ring 40 is also provided between the head of cylindrical shaft 21 and rotor housing 30 (output gear member 37), arranged such that free rotational control can be effected irrespective of direction of rotation. Also, in joint rotation transmission mechanism 9, sealing of the interior of the robot arm is aimed at by mounting suitable sealing means at the rotary contacting parts, in order that gas, water or other foreign matter cannot penetrate from the outside into the internal space of the arm through the rotary contacting parts when mounting is effected onto the joint between the arms. Also, 43 in the drawing is a trumpet-shaped protective tube arranged fitting into the through-hole of internally toothed bevel gear 24 in order to protect the signal line etc passing through internally toothed bevel gear 24 from damage. Also, although not shown in the drawing, a sensor to detect the position of the starting point of the rotation between the input/output shafts is provided in the harmonic drive mechanism.

If a joint rotation transmission mechanism 9 is constructed as above and an offset rotary joint assembly is constituted by unitarily assembling motor unit 8 and drive arm leading-end section 6b, these being assembled beforehand for each joint, assembly of a rotary articulateded robot can easily be achieved, since the drive arm and driven arm can be successively connected up through these offset rotary joint assemblies. Maintenance is also easy, since if an offset rotary joint fails, this offset rotary joint assembly can simply be replaced. Furthermore, in assembly of the arm, connection of the joint rotation transmission mechanism 9 to the driven arm can be achieved by fixing output gear member 37 to the driven joint plate 42, which is fixed at the inclined aperture section of the driven arm 7, either directly, or, as shown in the drawing, through rotor housing 30.

By mounting as above, the axis of rotation of joint rotation transmission mechanism 9 is inclined at an angle γ with respect to the arm axis LA of drive arm 6. As a result, angle of inclination γ becomes the offset angle and driven arm 7 performs conical rotational movement of offset angle γ, of which the vertex is the point of intersection of offset rotary axis LB and arm axis LA. Extremely complex three-dimensional movement can therefore be achieved simply by a combination of rotary movements, by combining a plurality of these offset rotary joints.

Next, the operation of joint rotation transmission mechanism 9 constructed as above will be described.

When motor 11 is driven, cylindrical shaft 21 is rotated with a prescribed rotational speed by means of externally toothed bevel gear 17 and internally toothed bevel gear 24. It can be arranged for a large torque to be generated by a small motor by reduction in accordance with the ratio of their diameters achieved by making the diameter of internally toothed bevel gear 24 large. Furthermore, since meshing of bevel gears is employed, there is scarcely any slippage or backlash and precise and quiet transmission can be achieved. By rotation of cylindrical shaft 21, the external circumferential surface of the long-axis part of the elliptical bearing flange 31 that is formed on the outer circumferential surface of this cylindrical shaft presses the cylindrical body portion 34 of input gear member 32 by a cam action, by means of bearing 27. The cylindrical body portion 34 of input gear member 32 is thereby resiliently deformed with the result that external teeth 35 mesh with internal teeth 36 of output gear member 37. As a result, the meshing position of the internal teeth and external teeth changes progressively with rotation of the cylindrical shaft so that when the cylindrical shaft has made one rotation the output gear member 37 has rotated by an amount corresponding to the difference in the number of teeth with respect to the input gear member. Consequently, if the number of teeth of the input gear is Zi and the number of teeth of the output gear member is Zo, the reduction ratio is (Zo−Zi)/Zo i.e. a large reduction can be achieved.

Consequently, in addition to the externally toothed bevel gear—internally toothed bevel gear transmission mechanism described above, a further large reduction in transmission ratio can be obtained by means of the harmonic gear mechanism, making it possible to achieve larger rotary torque with a small motor. This makes it possible to reduce the size and weight of the robot joints, and so is extremely advantageous for a robot joint mechanism. Also, by adopting an externally toothed bevel gear-internally toothed bevel gear transmission mechanism, mounting can be achieved with the motor always in coincidence with the arm axis irrespective of the offset angle, so there is no need to make the arm diameter at the joint large, and the entire rotary articulated arm can be constructed in the form of a pipe of small diameter, enabling its weight to be reduced.

Also, with the aforesaid reduction mechanism, since the meshing of the output gear member is effected by resilient deformation of the cylindrical body portion, the number of simultaneously meshing teeth is large, so the effects of errors of tooth pitch on rotational position are averaged out, enabling high—precision rotation to be achieved. Higher precision of positional location is thereby obtained with the offset rotary joint mechanism, which is beneficial for robot joints in which extremely high-precision movement is required. Furthermore, since there is no rolling contact between one tooth and another and the circumferential speed is low, the mechanism is extremely quiet and there is little vibration. This is therefore ideal for the joint mechanism of for example a nursing-care robot, where quietness and high precision of movement are required. Also, since the same joint rotation transmission mechanism is adopted for all of the joints, the reduction ratios of the rotary joints can easily be combined in various ways simply by altering the gear ratios: for example, a suitable combination can easily be achieved wherein the joints closer to the base are made to have a lower speed ratio while the joints closer to the end effector have a higher speed ratio.

Also, since the motor is a motor fitted with a brake, the rotational position can be strongly held even without providing a special actuator; it is therefore safe in that a large load can continue to be held securely in a prescribed position. For example, if rotation of the motor is stopped due to a power cut etc the brake is automatically applied so the arrangement is safe in that the current position can be maintained; also, energy-saving can be achieved, since it is unnecessary to maintain the braked condition by operation of an actuator, as was necessary conventionally. Also, an important characteristic of the offset rotary joint of the present embodiment is that, as described above, a hollow passage can be provided from the base of the robot arm to the end actuator including the joints, and the rotary sliding surfaces are completely sealed, so the hollow region within the arm can be perfectly cut off from outside.

Figure 3:
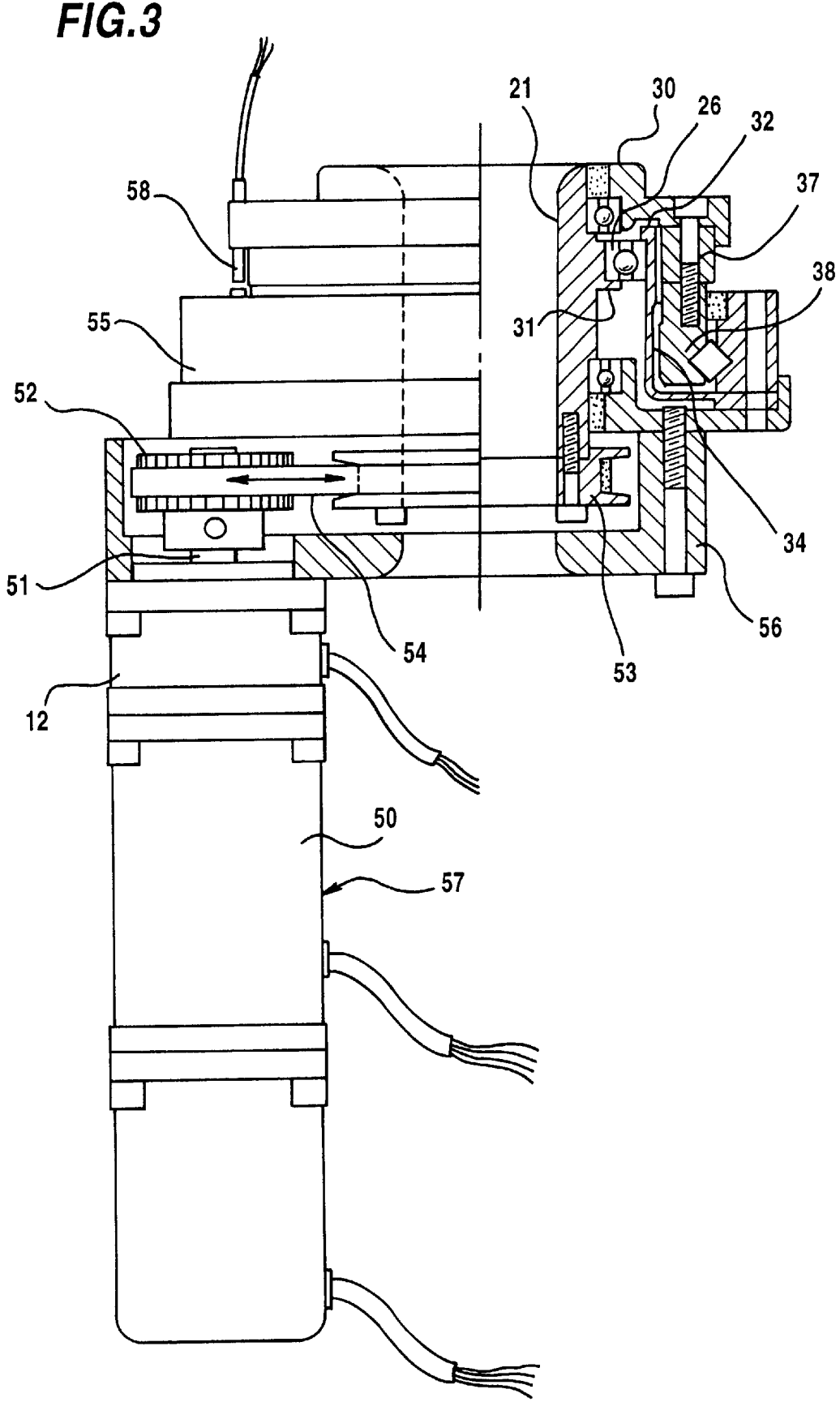
FIG. 3 is a partially broken away front view showing an offset rotary joint of a rotary articulated robot according to another embodiment of the present invention.

FIG. 3 shows another embodiment of an offset rotary joint according to the present invention. Members which are similar to those of the above embodiment are given the same reference symbols and only their differences are described. In this embodiment, as the transmission mechanism from the motor 50 to the joint rotation transmission mechanism, a belt transmission mechanism using a timing belt is employed. Specifically, a toothed pulley 52 is fixed to motor output shaft 51 and timing belt 54 is arranged between this and a pulley 53 fixed at the bottom end of cylindrical shaft 21, turning effort being thereby transmitted. In this case, therefore, by making pulley 53 of larger diameter than pulley 52, a reduction in transmission ratio can be achieved corresponding to the ratio of diameters, thereby enabling a large torque to be generated using a small motor. Furthermore, since transmission is performed using a timing belt, there is scarcely any slippage or backlash, and a precise and quiet transmission can be achieved.

It should be noted that, in this embodiment, the drive arm continues as far as its leading end while motor assembly 57 is fixed to the motor mounting housing 56 which is fixed to stator housing 55 of the joint rotation transmission mechanism mounted at the leading end aperture thereof. The motor shaft is therefore mounted parallel with the axis of cylindrical shaft 21 of the joint rotation transmission mechanism. In this embodiment, it is arranged that the rotor assembly should operate with two or more (two in the Figure) motors synchronized by axial coupling; thus, a large torque can be obtained using only small motors by coupling the motors if the torque is insufficient with a single motor. 58 is a sensor for detecting the starting point position.

Figure 4:
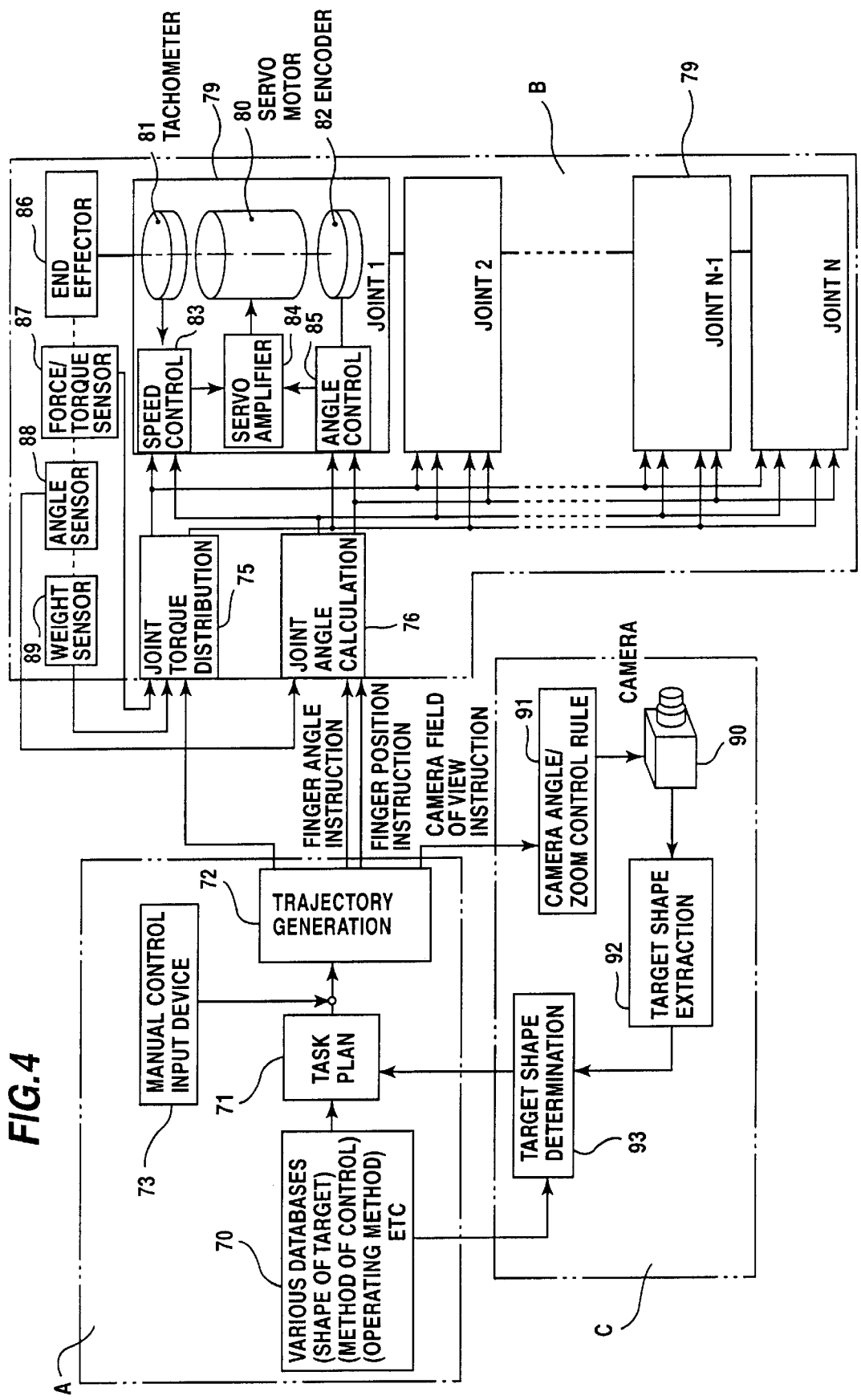
FIG. 4 is a block diagram based on a method of controlling a rotary articulated robot according to an embodiment of the present invention.

Next, an embodiment of a method of controlling a rotary articulated robot according to the present invention will be described with reference to a rotary articulated robot using the offset rotary joint described above. FIG. 4 is a block diagram illustrating the basic constitution of the method of controlling a rotary articulated robot according to the present invention.

The robot system of this embodiment comprises a task planning system A, a manipulator system (indicating the arm, joint, end effector, and drive operating unit including a control unit that directly controls these) B, and an image recognition system C.

The task planning system A comprises various types of database 70, task planning means 71, trajectory generating means 72 and, if necessary, a manual control input device 73 such as a joystick or keyboard for remote teaching or manual operation. In the various databases 70 all the information/data needed for task planning for performing the necessary tasks by the robot are determined and input. The information/data needed for task planning includes mode information of the rotary articulated robot main body (for example, the constitution of functions of the respective joints, and the constitution of functions of the end effector), installation information for the rotary articulated robot main body (co-ordinates of the fixed position of the rotary articulated robot main body, camera for image recognition and recognition subjects etc, and operational range of the rotary articulated robot etc), the method of operating the rotary articulated robot (information to determine manual operation mode, program operation mode, or automatic operation mode etc.). Also, block region data are stored for each block obtained by previous block teaching, to be described. Also, tasks of various types on objects of various shapes and can be fetched from databases by converting into ROM form various types of operational database obtained by converting into database form various types of basic operational details such as methods of assembly or methods of processing or object shape databases obtained by converting into database form the shapes etc of the subjects of the various tasks.

Task planning means 71 teach the rotary articulated robot positions for performing tasks, or attitude information, sequence, and task condition information etc by establishing an operational plan including the information converted into ROM form beforehand in the various databases, information from the image recognition system, or information from external input, and use this to teach trajectory generating means 72. Trajectory generating means 72 calculate the control quantities of the motors of the joints and/or end effector in order to move the rotary articulated robot along a designated path for executing the particulars of the task that it has been taught, and instruct manipulator system C accordingly. In this embodiment, the instructions from the trajectory generating means comprise finger force/torque instructions, finger angle instructions, finger position instructions, and camera field of view instructions.

Manipulator system B comprises joint torque distribution means 75 that determine the joint torques of the joints in accordance with the finger torque instructions from trajectory generating means 72, joint angle calculation means 76 that calculate the joint angles of the joints in accordance with the finger angle and/or finger position instructions, and joint unit means comprising a servo motor 80, tachometer 81 and encoder 82 etc provided at each joint 79, and force/torque sensor 87, angle sensor 88 and weight sensor 89 etc provided at the end effector 86. Each joint, in addition to a communication interface, joint torque distribution means 75 and joint angle calculation means 76 shown in FIG. 6 and to be described later comprises a CPU that executes commands and makes reports, and a joint database.

In the joint torque distribution means 75, there are held in ROM form the arm lengths of the joints that have been converted into ROM form previously in the databases, offset angles, rotational angular speed constants, servo motor constants, reduction ratios, tachometer constants, encoder constants, control constants of the angle and speed etc and the distribution laws of the joint torques based on the data peculiar to each joint, and the speed control quantities of each joint for executing the finger force/torque instructions at a fixed time point sent from the trajectory generating unit based on this distribution rule are determined and sent in parallel to each joint. Likewise the joint angle calculation means 76 calculates the angles of the joints needed to implement the finger angle instructions and finger position instructions from the trajectory generating means, and send these as angle control quantities in parallel to the respective joints.

At each joint, speed control signals (current control) from speed control means 85 based on the speed control quantities from the joint torque distribution means are sent through servo amplifier 84 to servo motor 80; normally, the servo motors of all the joints are rotationally driven simultaneously in parallel. The rotational speed of the motor is detected by tachometer 81 and is controlled so that the target value is achieved, by feedback of this detection result to the speed control means. Likewise, an angle control signal from the angle control means of each joint, based on the angle control quantity from joint angle calculation means 76, is sent to servo amplifier 84 where it is combined with the speed control signal to drive servo motor 80. The motor rotational angle is successively detected by encoder 82 and is controlled such that the target value is achieved by being fed back to angle control means 85.

End effector 86 is moved by the combination of the movement of the respective arms produced by the rotation of the servo motors at each joint. The movement of end effector 86 is detected by force/torque sensor 87, angle sensor 88, and weight sensor 89 that are provided thereat, and is fed back to the joint torque distribution means 75 and the joint angle calculation means 76. Control as above is repeated until this movement attains the target torque, angle and position. When the position and angle of the finger reaches the prescribed value, the task is terminated and processing moves on to the next task. At this point, the new position of the finger and the surrounding circumstances are obtained by image detection by the joint camera and base camera and provided to the next task.

Image recognition system C comprises base camera 90, joint cameras (not shown in FIG. 4), camera control rule generating means 91 for camera angle/zoom control that control the cameras in accordance with instructions from trajectory generating means 72, target shape extraction means 92 that extract the shape of the target from the camera image, and shape determination means 93 of the target article; this system extracts the three-dimensional positional coordinates with respect to the co-ordinates of installation of the rotary articulated robot based on a comparison (collation) of signals and CCD images from the respective joints of the rotary articulated robot with the shape database, and thereby performs determination of the position of the target object and calculates the size of the shape.

Figure 5:
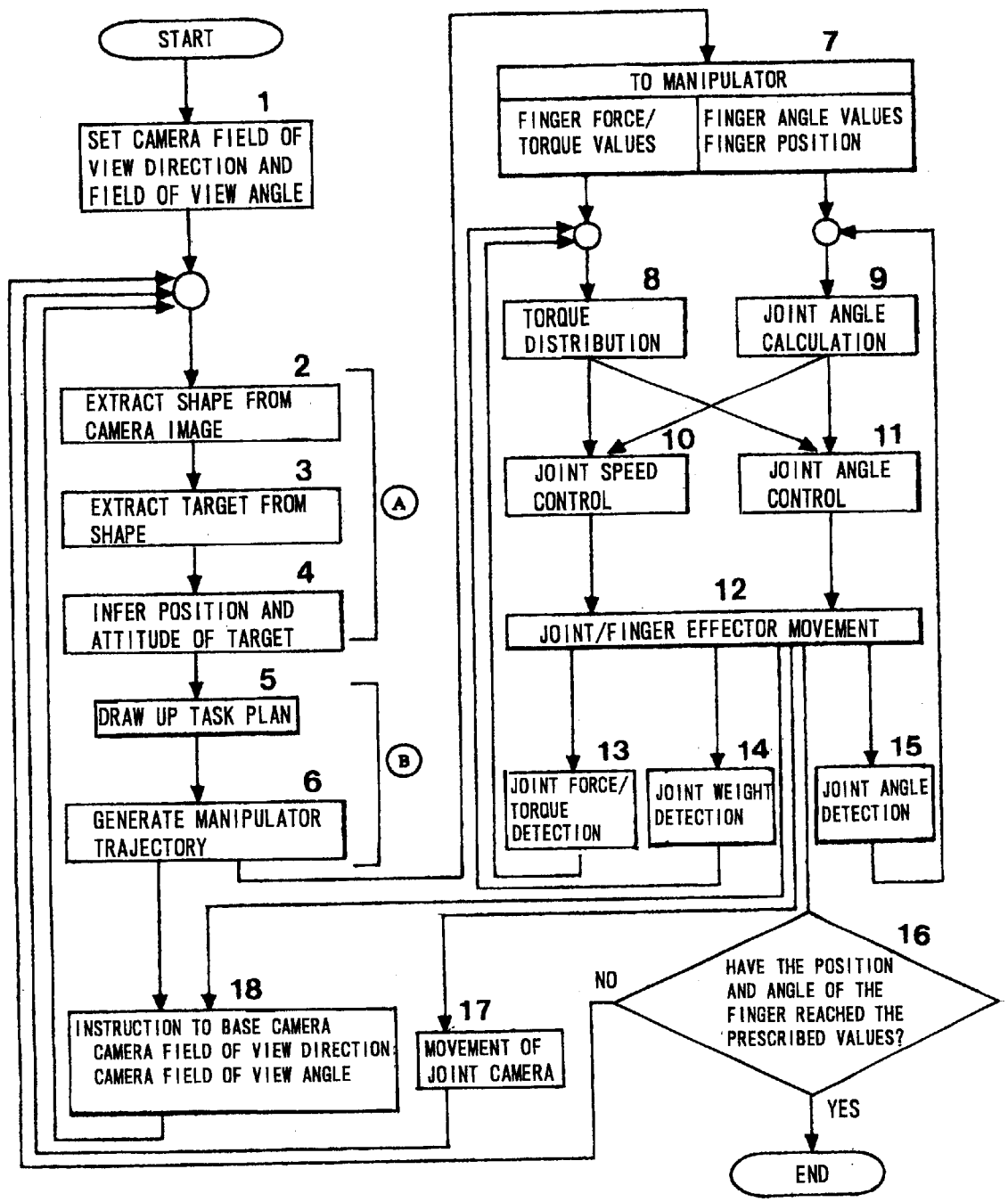
FIG. 5 is a flow chart illustrating the operation thereof.

Next, the basic operating sequence of a rotary articulated robot according to the present embodiment comprising a system as described above will be described with reference to the flow chart shown in FIG. 5.

When a task is commenced, the initially set values of the rotary articulated arm, end effector and camera are fetched from the various databases 70, information about the structure of the rotary articulated arm, the structure of the end effector and the camera system is fetched, and the rotary articulated arm, end effector and camera are respectively set to their initially set values. In this way, the direction of the field of view of the camera and its field of view angle are initially set (step 1). In accordance with these, the cameras pick up images of the vicinity of the subject of the task and subject these to signal processing to extract the shape of the objects' contours (step 2). Signal processing methods that may be adopted include the method of extracting the shape of the objects' contours by two-level or multi-level conversion, the method of extracting object surfaces by connecting up adjacent regions of about the same brightness, and the method of extracting object surfaces by connecting up adjacent regions of about the same color. The target is then extracted (step 3) from the extracted shapes, and the shape of the extracted object's contour and its surface shape are compared with a database in which the shape of the subject of the task is stored, and the position and attitude of the subject of the task are thereby inferred (step 4). Also, the position and attitude of obstacles constituted by objects other than the subject of the task are stored.

In this way, when the position and attitude of the task subject and obstacles have been inferred, the task planning means draw up a task plan (step 5) based on these inferred signals. When the position and attitude of the task subject have been supplied, the task plan determines the position and attitude of the end point of the finger in accordance with data such as the details of the task (assembly, processing, welding, testing etc) stored in a previously taught execution file or control method stored in a database. Next, trajectory generating means 72 obtain control quantities (step 6) by calculating the trajectory from the starting-point position and attitude of the finger to the end-point position and end-point attitude. The trajectory of the finger is determined and the trajectory is generated such as to avoid obstacles obtained from the image information.

When the trajectory generation has been completed, the instructions necessary for generating the trajectory by the offset rotary joints and end effector are supplied (step 7) to the joint angle calculating means 76 and joint torque distribution means 75 of the manipulator system as a finger position instruction, finger angle instruction and finger force/torque instruction. In accordance with these instructions, time sequence values of the respective joint angles are calculated (steps 8, 9) such that the finger moves along the track and the image arm avoids the obstacles obtained from the image. Joint speed control and joint angle control of the respective joints are effected in accordance therewith (step 10, step 11), and movement is effected along the joint/end effector trajectory by controlling the rotation of the motors.

When the movement is completed, detection of the force/torque of the finger and weight detection of the finger are performed and these are fed back to step 8 (steps 13, 14), and angle detection of the finger is performed and fed back to step 9 (step 15). A decision is then made as to whether the position and angle of the finger have reached the prescribed values (step 16) and, if the prescribed values have been reached, the operation is terminated. If the prescribed values have not been reached, processing returns to step 2 and the same control is repeated. Since in this process the joints/end effector are moving, the joint cameras also move concurrently, and the new images generated by this movement are supplied to step 2 (step 17). Likewise, the images resulting from the movement are supplied from the base camera to step 9 (step 18).

The above is the basic control method for a rotary articulated robot according to the present invention. Since in the rotary articulated robot of the present invention all the joints are offset rotary joints, free selection of direction and position of the end effector in a three-dimensional space, which was difficult to achieve with the conventional three-dimensional robots can be achieved simply by offset rotation of the joints. Furthermore, the combination of movements of the arm can achieve a winding movement like a snake, so, for example, tasks can be performed even on task subjects that are in positions (for example behind obstacles) that the end effector can only reach by passing through a complicated path. When performing a complex task by utilizing this characteristic of the rotary articulated robot of the present invention, if, as conventionally, for example a trajectory is generated by performing teaching of the track i.e. teaching of the operating points from the starting point of the end effector to the target position and calculating control quantities of the motors arranged at the joints of the rotary articulated robot between the operating points that have been thus taught, an enormous quantity of information has to be processed at each time point, so the computer load is increased, resulting in the problem of slow speed of response.

Accordingly, according to the present invention, in order to solve the above problem, there have been devised in particular as described below a novel method of task teaching adopting (1) a block teaching method in the task planning system and (2) networking of the joints and central computer in the manipulator system.

(1) Block Teaching Method

It was found that an enormous shortening of the data processing time could be achieved by a combination of two methods, namely, a block teaching method, in which the range of possible movement of the end effector (operating region) is roughly divided into a plurality of blocks B, and the trajectory to a block in which an operating region of the end effector is present is taught in block units and converted into database form; and a operating point teaching method, in which, when a task is performed in which the end effector is determined in a narrow range, the details of this task are taught in task units and converted into database form.

In more detail, in the block teaching method, as shown in FIG. 1, the operating region of the end effector is roughly divided into blocks (54 blocks in the Figure), and specific angles of rotation and rotary angular speed of each joint necessary to effect movement to such blocks are pre-taught and converted into database form. Although there are innumerable paths of movement to each block, the movement of each joint is defined solely by its angle of rotation, so if for example a combination of angles of rotation of the respective offset rotary joints is defined in a condition in which the end effector is positioned at a reference point of a particular block, the conditions of the joints in order for the end effector to be positioned at that block can be instantaneously found from the database once the block is specified. In the example illustrated, if at least a 54—fold database is prepared, unless there is a restriction on the path of movement, operating points from the block of the end effector etc to the target block can be instantaneously taught by utilizing this database, and a corresponding trajectory generated.

Also, if the operating region concerns a block boundary region, control is automatically effected whereby an adjacent block is selected and database items of this block relating to operation of the joints are fetched. Also, if the operating region extends beforehand to a wide region, the method is adopted of performing the task by combining a plurality of blocks. The method of combining the blocks may be in horizontal groups, vertical groups or vertical and horizontal groups; these are fetched from the database.

The movement within the block after the end effector has reached the reference position of the block in which the operating region is located may be performed by storing teaching of operating points and teaching of the task details in an execution file in the same way as hitherto and then fetching this. Alternatively, automatic operation may be performed by drawing up a task plan using the image information from the joint cameras and/or base camera and an optimum control rule, or manual operation using a joystick etc. In this case, since only movement within a specific block is involved, only a few joints need to be operated and track generation can be achieved with little calculation processing; thus there is little load on the computer, so increased speed can be achieved.

Furthermore, if the task in the block is a task determined as described above (for example, a method of assembly, a method of processing, a method of welding, or a method of testing etc), if the details of the tasks in each block are taught and converted to database form, a track for achieving the details of the task within a block may be instantaneously generated by fetching these from the database when the block of the operating region in question is reached. Since the joints that are capable of movement within the narrow range within the block are few, instead of being restricted to a specific block, the task details teaching data converted into database form can be copied to another block and employed there; thus, control is easier than with a conventional robot control system, and can therefore be speeded up. Furthermore, by converting the teaching details into the form of a function, they can be applied with the movement reduced or magnified in extent.

(2) Networking of the Joints

Figure 6:
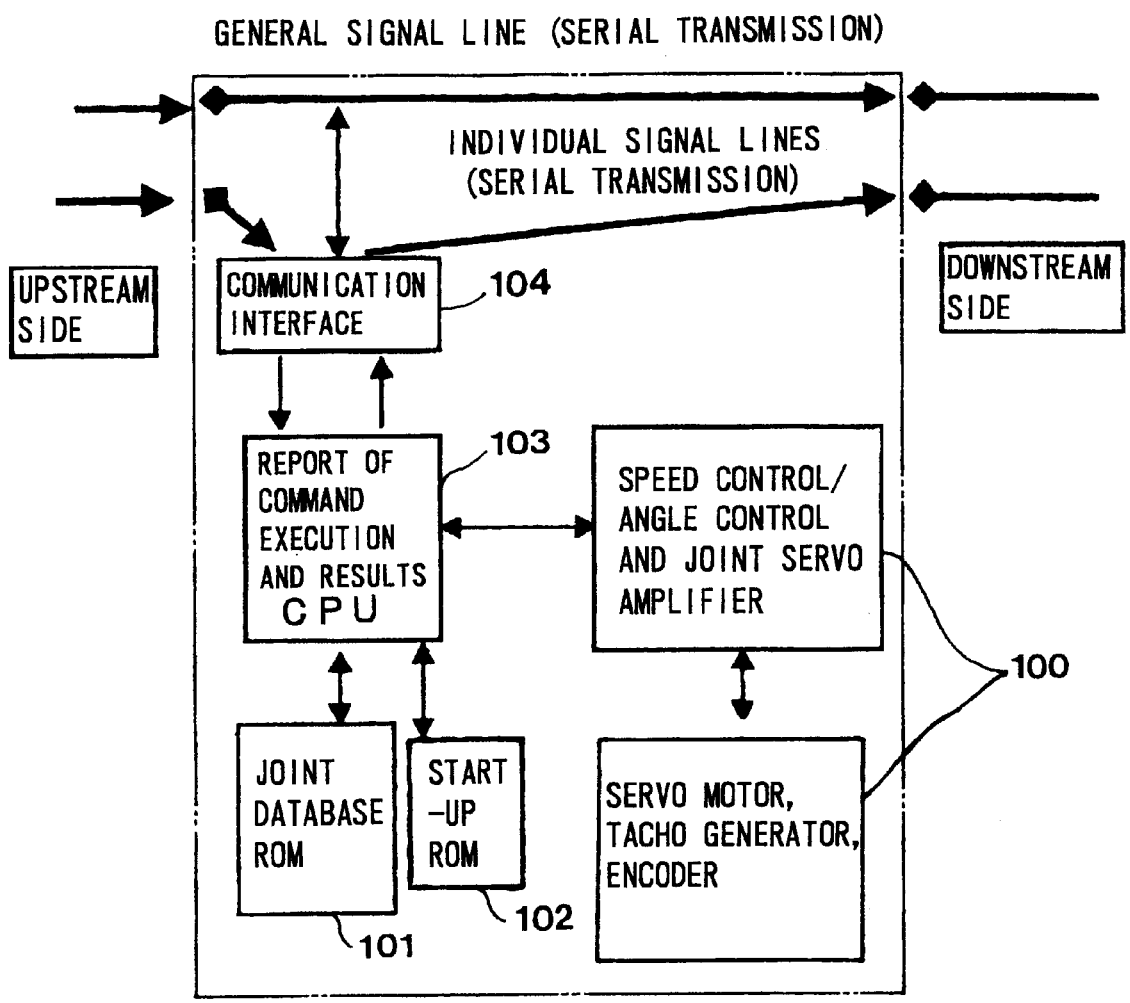
FIG. 6 is a block diagram of joints constituting a network according to a method of controlling a rotary articulated robot according to an embodiment of the present invention.

In order to construct a network, as shown by the block diagram in FIG. 6, the joints are provided with a communication function by providing, in addition to mechanical system 100, joint database ROM 101, start-up ROM 102, CPU 103 and communication interface 104. The joint database ROM stores data characteristic of each joint, such as the arm length of the joint, its offset angle, the respective speed constants of rotation, the servo motor constants, the tachometer constants, the encoder constants, and the angle and speed control constants.

In this embodiment, as the signal lines for the joint signals, there are essentially provided a general signal line 105 and individual signal line 106; the network is constituted such that these can be employed with switching effected between these two. For example, overall initial setting is facilitated by having a joint notify the control computer and all the joints of the sequential number of this joint and what joints it is connected to in response to a start-up signal from the upstream side on the individual signal line when the power source is switched on, by the communication interface sending the contents of its own joint database to the general signal. Also, if the offset rotary joints of the present invention are adopted, the number of combinations of movement (rotation) of the joints in order to form a given robot trajectory is innumerable and the movement of a single joint is not directly linked to the movement of the end effector, so, by forming a network of the joints as described above, failure of a single joint can be compensated by the other joints.

Figure 7:
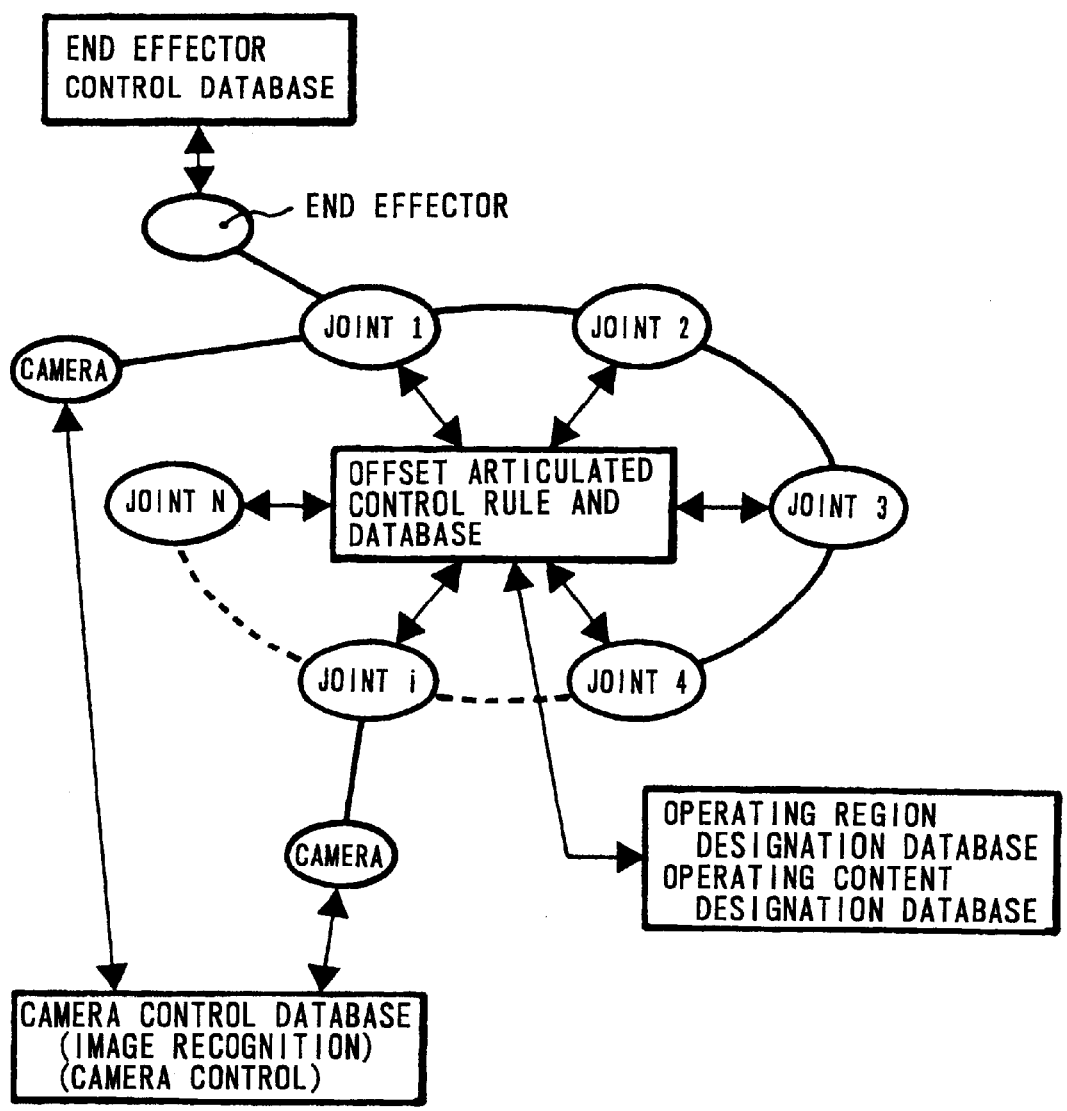
FIG. 7 is a network layout diagram.

In the case of block teaching, as shown diagrammatically in FIG. 7, by a connecting each joint individually to the joint torque distribution means and joint individual calculation means through the general communication line, each joint can execute commands directly and report the results, and a trajectory can be executed in accordance with the block teaching. Also, in the case of performance of winding movement like a snake, a joint can receive the angle of the adjacent joint on the outward side by the individual signal line and can send its own joint angle to the adjacent joint on the base side. In this way, there is no communication with the computer that performs overall control, so the load on the computer is lightened, enabling the calculation speed to be raised, and so making it possible to perform complicated movements smoothly.

Although the case was described above where the task was performed by a single rotary articulated robot, a plurality of such robots could be installed, the task being performed by the plurality of robots working in concert.

With a rotary articulated robot according to the present invention as described above, the link on the driven side of the offset rotary joint executes conical rotary movement with an offset angle, the vertex thereof being the point of intersection of the link axis and the offset rotation axis, so, by providing a plurality of offset rotary joints, precise three-dimensional positional location can be achieved over a wide range of movement of the end effector by a simple mechanism involving only rotary movement. Furthermore, since, in each joint, the rotary joint transmission mechanism in the joint is a high reduction ratio transmission/torque increasing mechanism, even if small-sized drive motors are adopted, a stronger rotary torque can be transmitted, making it possible to form the joints with small size and light weight. This is very advantageous for a multi-link rotary articulated robot, making it possible to obtain offset rotary links which are of small size and light weight yet with a higher payload, and to obtain a highly functional rotary articulated robot capable of control with precise positional location.

Since in the rotary articulated robot of the present invention the entire arm including the offset rotary joints and coaxial rotary joints can be formed as a continuous hollow tube, it can be employed as a supply path for various substances and/or energy and/or signals etc directly from the main body of the robot by providing a flexible hose or the like within the arm. Furthermore, this supply path is within the arm tube, so it is protected without any possibility of being directly exposed to the external environment. This makes it possible to supply substances etc in an adverse environment, thereby enabling a robot to be obtained which is very much more suited to multiple applications.

With the method of control of a rotary articulated robot according to the present invention, even in the case of a rotary articulated robot whose arm performs complicated movement, the trajectory to the target position can be generated in a simple fashion without needing a complicated calculation simply by designating the block in which the operating region is located, and smooth movement with a rapid response can be achieved.

What is claimed is:

1. A rotary articulated robot having at least a plurality of offset rotary joints wherein a drive arm and driven arm are driven in rotation about an offset rotary axis inclined with respect to the arm axis, a hollow rotary shaft that is driven in rotation by a motor is arranged rotatably, being inclined at a prescribed offset angle, at a leading end of either the drive arm or the driven arm, while a rotor member to which turning effort is transmitted from the hollow rotary shaft is fixed at the base of the other arm, and said hollow rotary shaft and said rotor member constituting a high reduction ratio transmission/torque increasing mechanism.

2. The rotary articulated robot according to claim 1 wherein said high reduction ratio transmission mechanism comprises said hollow rotary shaft with a cam surface formed on hollow rotary shaft its outer surface, an input gear member whose inner circumferential surface is a cam operating surface that engages with the cam surface of said hollow shaft, and whose outer circumferential surface is a toothed surface which is resiliently deformably fixed, and an output gear member whose number of teeth is slightly more than that of this input gear member, said output gear member constituting said rotor member.

3. The rotary articulated robot according to claim 1 or 2 wherein said motor is arranged such that axis of rotation is coincident with or parallel with the arm axis, and the turning effort from the motor to the hollow rotary shaft is transmitted by means of a bevel gear transmission mechanism comprising meshing of an externally toothed bevel gear fixed to the output shaft of the motor and an internally toothed bevel gear fixed to the base of said hollow rotary shaft.

4. The rotary articulated robot according to claim 3 wherein the case of said motor constitutes part of arm.

5. The rotary articulated robot according to claim 1 or 2 wherein the turning effort from said motor to the hollow rotary shaft is transmitted by means of a belt transmission mechanism comprising a pulley fixed to the motor output shaft, a pulley fixed to the base of said hollow rotary shaft, and a timing belt arranged between this pulley and said pulley.

6. The rotary articulated robot according to claim 1 or 2 wherein said motor is a motor with a brake formed integrally with an integral encoder and tachometer.

7. The rotary articulated robot according to claim 1 or 2 wherein the shaft end on the opposite side to output side of said of motor shaft projects and a manual rotary adjustment portion is provided on a projection.

8. A method of controlling a rotary articulated robot wherein an operating region of an end effector is divided into a plurality of blocks, and operating conditions of each joint necessary for movement to a prescribed block are converted to database form as block region data for each block, so that the operating conditions for each joint are determined by means of the block region data fetched from said database when a block of the operating region is selected beforehand.

9. The method of controlling a rotary articulated robot according to claim 8 wherein motor control is performed independently at each joint such that said block region data is satisfied, by comparing the block region data supplied from said database with a current operating condition at each joint.

10. A method of controlling a rotary articulated robot wherein a teaching of operating points in a prescribed block region is converted to database form as operating point data and, when an end effector reaches this block region, operation of each joint is determined by fetching an in-block operating point data from said database.

11. A method of controlling a rotary articulated robot wherein an operating region of an end effector is divided into a plurality of blocks, an operating conditions of each joint necessary for movement to a prescribed block are converted to database form as block region data each block and the teaching of an operating point in a prescribed block region is converted to database form as in-block operating point data, so that the operating conditions for each joint are determined by means of the block region data fetched from said database when a block of the operating region is selected beforehand, and when the end effector has reached a reference point of said selected block by being moved to a prescribed operating block by driving of joints so as to satisfy these conditions, operation of the joints is determined by fetching said in-block operating point data.

12. A method of controlling a rotary articulated robot wherein each joint is provided with a calculation processing device, joint database and communication interface, and a network is constituted such that a central controller that controls the movement of the robot as a whole and joints are independently connected and data directly exchanged between the joint control devices, so that the joints controlled in parallel and information directly sent to adjacent joints without passing through the central controller.

* * * * *